March 6, 1928.
D. I. REITER
1,661,911
FASTENING DEVICE
Filed Aug. 12, 1927
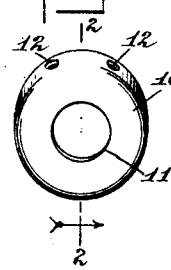
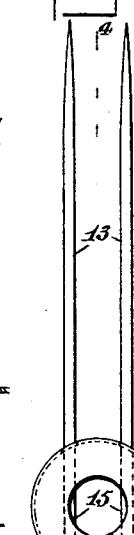
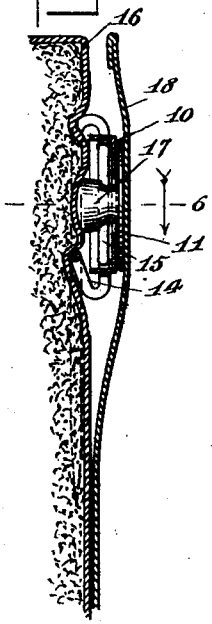
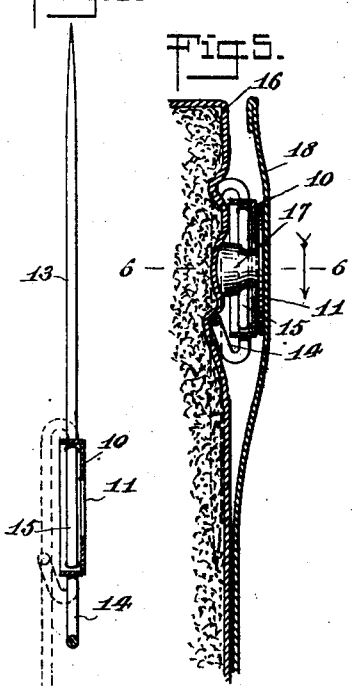
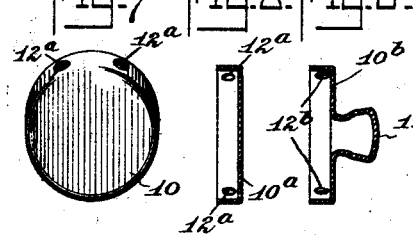
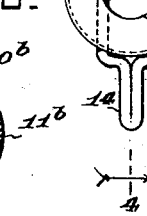
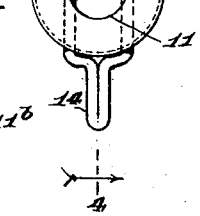
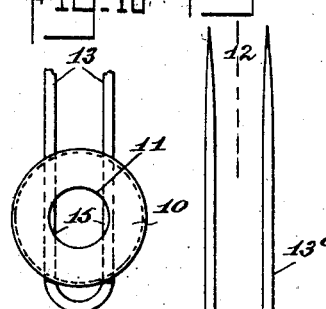
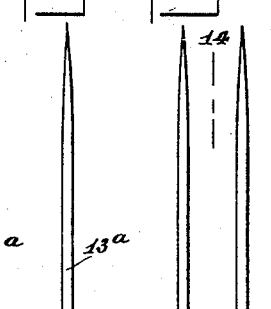
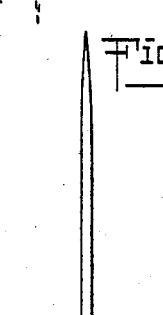
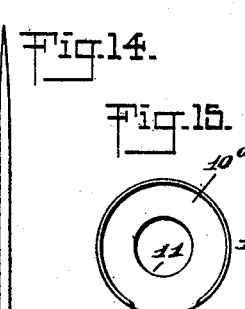
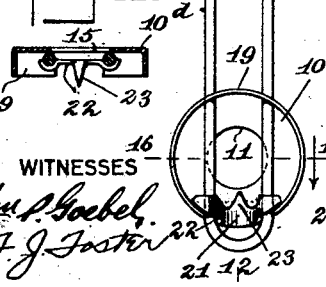
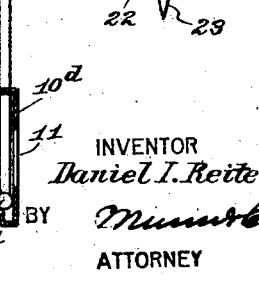
WITNESSES
INVENTOR
Daniel I. Reiter
BY
ATTORNEY Patented Mar. 6, 1928.

1,661,911

UNITED STATES PATENT OFFICE.

DANIEL I. REITER, OF NEW YORK, N. Y.

FASTENING DEVICE.

Application filed August 12, 1927. Serial No. 212,518.

The present invention is concerned with a fastening device which may have a wide range of utility in the arts, but which finds one of its preferred embodiments as a securing means for the dust covers on automobile upholstery.

The present invention represents an improvement over my re-issued Patent No. 16,660, dated June 21, 1927.

It will be recalled that in the pending application I disclosed a double pointed pin fastener consisting of a pin and cap. The pins in addition to serving their usual function, also provided a spring socket in the cap for the reception of a stud member.

In accordance with the present invention, I have devised an extremely simple, and practical construction, which embodies the inventive concept of the prior application, and yet which materially decreases the cost of manufacturing the fasteners, increases their strength and durability, and assures absolute accuracy and exact spacing of the socket-forming portions of the pins.

Other and more general objects of the invention are to provide a fastener, preferably of two pieces, to wit: the pin-forming wire and the cap, which may be stamped, bent, and assembled with economy and expedition; a fastener which will be extremely efficient in use, and neat and attractive in appearance.

With the above noted and other objects in view, the invention consists in certain novel features of construction and combinations and arrangements of parts, as will be more fully hereinafter set forth and pointed out in the claims. The invention may be more fully understood from the following descrip tion in connection with the accompanying drawings, wherein—

Fig. 1 is a perspective view of the cap portion of my improved fastener.

Fig. 2 is a transverse sectional view therethrough on the line 2—2 of Fig. 1.

Fig. 3 is a view showing the partially formed wire and the cap assembled preparatory to completing the bending of the wire.

Fig. 4 is a longitudinal sectional view on the line 4—4 of Fig. 3, the dotted lines indicating the final position of the wire after the latter has been bent.

Fig. 5 is a fragmentary sectional view through an automobile cushion and dust cover showing the fastener in applied position and cooperating with an associated stud member.

Fig. 6 is a transverse sectional view on the line 6—6 of Fig. 5.

Fig. 7 is a perspective view similar to Fig. 1, but illustrating a modified form of cap.

Fig. 8 is a section through the cap of Fig. 7.

Fig. 9 is a view similar to Fig. 8, but illustrating a further modification.

Fig. 10 is a fragmentary plan view similar to Fig. 3, but showing the fastener in which the prong or wedge member is eliminated.

Fig. 11 is a reverse plan view similar to Fig. 3, but illustrating a modified form of fastener.

Fig. 12 is a longitudinal sectional view on the line 12—12 of Fig. 11, the dotted lines indicating the final position of the wire after bending has been completed.

Fig. 13 is a view similar to Fig. 11, but illustrating a further modification.

Fig. 14 is a longitudinal sectional view on the line 14—14 of Fig. 13.

Fig. 15 is a plan view of the rear side of the cap used in Figs. 11 and 12 prior to the final bending of the cap.

Fig. 16 is a transverse sectional view on the line 16—16 of Fig. 11.

All of the fasteners shown in the drawings include a cap portion. These cap portions are subject to variation in shape and construction in accordance with whether the fastener is to be used as the male or female element of a separable connection, or whether the fastener is to be used simply as a headed pin for pinning two fabrics together.

In Fig. 1 I have shown a cap 10 which consists simply of a flanged disc having a central opening 11 and having two pairs of equi-distant spaced opposed openings 12 in its flanges for the reception of the two pointed ends or pin portions 13 of the wire which cooperates with the cap to form the fastener proper. In the form of the invention shown in Figs. 1 to 6, the extremities of the wire constitute the parallel pointed pin portions 13, and the intermediate portion of the wire is pinched together as at 14 constituting a wedge or spur, for a purpose which will be later described. In assembling the device, the cap of Fig. 1, and the wire of Fig. 3 are united by inserting the pointed ends of the wire through the aligned pairs of openings 12 in the cap flanges. This assembly provides under the cap a pair of spaced parallel spring arm portions 15 cooperating with the cap opening 11 to form the socket member of a separable snap fastener unit. After the assembly has been made as illustrated in Fig. 3, the prong or wedge portion 14 is bent upwardly as indicated in dotted lines in Fig. 4, and the pin portions 13 are bent downwardly as indicated also in dotted lines in this figure. At this time the pin portions lie parallel to the cap 10, but in spaced relationship thereto, and the prong or wedge 14 lies between the two pins.

The fastener is applied to an automobile cushion or other point of anchorage as in Fig. 5, by simply inserting the pins through the fabric. When in applied position, a portion of the fabric will lie between the pins 13 and the cap 10 as seen in Fig. 5, and the wedge or spur 14 will cooperate with the pins to retain the fastener against accidental movement. I have shown the member 14 as a wedge which simply cooperates with the pins 13 to clamp the fabric, but it is apparent that it might be sharpened and pointed in order to act as a spur which will actually penetrate the fabric and prevent direct withdrawal of the fastener.

With the fastener in place in a cushion such as the cushion 16 of Fig. 5, a cooperating stud member 17 on a dust cover 18 may be readily inserted, this stud passing through the opening 11 and forcing the arms 15 apart. As soon as the stud is passed, the arms snap together around the neck of the stud and retain it against accidental displacement.

In Figs 7 and 8 of the drawings I have shown a type of solid cap $10^a$ formed with openings $12^a$ in its flanges corresponding to the openings 12 in Fig. 1. This cap might readily be assembled upon the same type of wire, in which instance the fastener instead of forming one element of a separable fastener, would simply comprise a headed pin and the pin portions of the fastener would be passed through both the dust cover and the cushion, pinning the cover directly to the cushion. In Fig. 9 I have illustrated a further modified type of cap $10^b$ which is provided with an integral stud portion $11^b$ instead of with a central opening 11. The flanges of this cap are provided with pairs of aligned openings $12^b$ for the reception of the pins. It is to be understood that in one of the three forms of caps shown; that is, either the socket type, stud type, or solid type, might be used either in connection with the wire of Figs. 3 and 4, or with the various modified forms of pin portions which I am about to describe.

In Fig. 10 I have shown a fastener in all respects similar to that of Fig. 7, except that the spur or wedge 14 has been eliminated. In Fig. 11 I have illustrated a modification in which the flange 19 of a cap $10^d$ is formed with only one pair of openings, and opposite the openings is cut away as at 20, so that the pin portions 13 may lie within the cut away portion of the flange. In this form of the invention, the cap is integral with a laterally extended tongue portion 21 carrying at its end a flaring plate 22. In assembling this device the tongue 21 and its associated plate 22 is first bent at right angles to the position shown in Fig. 13, and the pin slid into place astraddle of the tongue 21. The tongue and its associated plate are then bent over to the position shown in Fig. 11, in which position the wire is held against movement away from the rear face of the disc $10^d$. If desired, the plate 22 may carry an integral spur portion 23.

The modification shown in Figs. 13 and 14 is similar to that of Figs. 11 and 12, except that instead of using two integrally connected pins, I use two separate pins $13^b$ formed with T-heads $13^d$. Here, the T-heads are clamped by the plate 22.

In the forms of invention shown from Figs. 10 to 16 inclusive, the final bending operation of the pins is the same as that above described, and the manner of use of the device is also similar.

Obviously various changes and alterations might be made in the general form and arrangements of the parts described without departing from the invention. Hence I do not wish to limit myself to the details set forth, but shall consider myself at liberty to make such changes and alterations as fairly fall within the spirit and scope of the appended claims.

I claim:

1. A double pointed pin fastener of the class described including a flanged cap, a pair of generally parallel pins passed through the cap flange, and bent back into substantial parallelism with the plate.

2. A double pointed pin fastener of the class described including a flanged cap, a pair of generally parallel pins passed through the cap flange, and bent back into substantial parallelism with the plate, the flange being formed to guide, anchor, and properly space the pins.

3. A double pointed pin fastener of the class described including a flanged cap, a pair of generally parallel pins passed through the cap flange, and bent back into substantial parallelism with the plate, the cap having an opening therein through which a stud member is adapted to be inserted and gripped by the portions of the pins lying under the plate.

4. A double pointed pin fastener of the class described including a flanged cap, a pair of generally parallel pins passed through the cap flange, and bent back into substantial parallelism with the plate, the flange having two pairs of opposed pin guiding openings therein.

5. A double pointed pin fastener of the class described including a flanged cap, a pair of generally parallel pins passed through the cap flange, and bent back into substantial parallelism with the plate, the flange having two pairs of opposed pin guiding openings therein, and the pins being integrally connected and constituting the arms of a generally U-shaped spring wire member.

6. A double pointed pin fastener of the class described including a flanged cap, a pair of generally parallel pins passed through the cap flange, and bent back into substantial parallelism with the plate, the flange having two pairs of opposed pin guiding openings therein, and the pins being integrally connected and constituting the arms of a generally U-shaped spring wire member, the intermediate portion of the wire member providing an integral fabric-engaging extension adapted to lie between the pins when the fastener is applied to a fabric.

7. A fastener including a flanged cap, a generally U-shaped wire member, the arms of which are passed through the cap flange, and the extremities of which are bent back upon the arms to define pins lying parallel to and spaced from the cap.

8. A fastener including a flanged cap, a generally U-shaped wire member, the arms of which are passed through the cap flange, and the extremities of which are bent back upon the arms to define pins lying parallel to and spaced from the cap, the flange having pairs of wire receiving openings therein guiding, retaining and spacing the wire arms.

9. A fastener including a flanged cap, a generally U-shaped wire member, the arms of which are passed through the cap flange, and the extremities of which are bent back upon the arms to define pins lying parallel to and spaced from the cap, the flange having pairs of wire receiving openings therein guiding, retaining and spacing the wire arms, the flange having a cutaway portion at one side in which the arms are received and openings at the opposite side through which the arms project, and a bendable tongue at the cutaway portion adapted to be bent over the arms to secure them.

10. A fastener including a flanged cap, a generally U-shaped wire member, the arms of which are passed through the cap flange, and the extremities of which are bent back upon the arms to define pins lying parallel to and spaced from the cap, the flange having pairs of wire receiving openings therein guiding, retaining and spacing the wire arms, the flange having a cutaway portion at one side in which the arms are received and opening at the opposite side through which the arms project, and a bendable tongue at the cutaway portion adapted to be bent over the arms to secure them, said tongue carrying an integral spur.

Signed at New York, in the county of New York and State of New York, this 11th day of August, A. D. 1927.

DANIEL I. REITER.